United States Patent [19]

Rostler

[11] 4,254,336
[45] Mar. 3, 1981

[54] MULTIPASS ILLUMINATION OF AN ELONGATED ZONE

[75] Inventor: Peter S. Rostler, Arlington, Mass.

[73] Assignee: Jersey Nuclear-AVCO Isotopes, Inc., Bellevue, Wash.SHINGTON

[21] Appl. No.: 892,083

[22] Filed: Mar. 31, 1978

[51] Int. Cl.² .................. B01D 59/00; B01D 59/46; G02B 17/00; F21V 7/14

[52] U.S. Cl. .................. 250/294; 250/298; 350/55; 350/299; 362/254; 362/298; 362/301; 250/423 P

[58] Field of Search .............. 350/55, 293, 294, 299; 356/318, 320, 437; 250/423 P, 294, 298; 362/259, 298, 301

[56] References Cited

U.S. PATENT DOCUMENTS

| | | | |
|---|---|---|---|
| 2,779,230 | 1/1957 | White | 350/202 X |
| 3,531,183 | 9/1970 | Aagard | 350/299 X |
| 3,748,014 | 7/1973 | Beiser | 350/55 |
| 3,825,325 | 7/1974 | Hartley et al. | 350/299 |
| 4,082,633 | 4/1978 | Eerkens | 204/157.1 R |

OTHER PUBLICATIONS

Pickett, H. M. et al., "A New White Type Multipass Absorption Cell," *Applied Optics*, 9(10):2397–2398, Oct. 1970.

*Primary Examiner*—Richard E. Schafer
*Attorney, Agent, or Firm*—Weingarten, Maxham & Schurgin

[57] ABSTRACT

A system for providing multiple traversal illumination of a region with a beam of radiation wherein the illumination provides substantial but not complete overlap at each repeated pass of the beam throughout the region. Because there is a slight shift in direction of the beam on each traversal of the region, it is possible to apply the beam and extract it after a predetermined number of traversals, and means are provided for this purpose. In addition, more than one beam may be applied to the same region, each having a different, predetermined number of traversals before extraction. In this manner, a form of beam combination is achieved.

33 Claims, 9 Drawing Figures

MULTIPASS ILLUMINATION OF AN ELONGATED ZONE

FIELD OF THE INVENTION

The present invention relates to method and apparatus for illuminating a region with a predetermined number of substantially overlapping traversals of a beam of radiation.

BACKGROUND OF THE INVENTION

The practice of laser isotope enrichment is in part exemplified in U.S. Pat. Nos. 3,772,519 and 3,939,354, and in United States patent application of P. G. DeBaryshe et al, entitled SYSTEM FOR ILLUMINATING A REGION FOR ISOTOPICALLY SELECTIVE PHOTOEXCITATION, filed herewith, all commonly assigned and incorporated herein by reference. In the practice there shown, it is desirable to illuminate a vapor environment, typically of uranium, with multiple traversals of radiation. The radiation may or may not overlap between different traversals to a significant degree.

Substantial overlap would bring the benefit of increased intensity of the radiation within the illuminated area as well as more uniform and homogeneous utilization of the energy in the beam within the illuminated region, thereby reducing path length. In the extreme, it would be desirable to have complete overlap from traversal to traversal. Such a condition, however, would make difficult or impossible the initial injection of the radiation into the region as well as its recovery after a predetermined number of traversals.

SUMMARY OF THE INVENTION

In accordance with the teaching of the present invention a system is disclosed for applying radiation through a three-dimensional region in a succession of substantially, but not completely, overlapping beam traversals of that region. The orientation or angle of the beam on each traversal is slightly displaced from the orientation on the preceding traversal so that the zone illuminated by each traversal is slightly different. This permits the beam to be focused to distinct points or lines outside of the region. The separate focus points provide opportunities or windows through which the beam or beams may be applied or retrieved after a predetermined number of traversals.

In particular implementation, a beam of radiation is focused to a point or line upon a mirror surface which reflects it toward a first focusing mirror which in turn directs it as a parallel or collimated beam through the region. After traversing the region, the parallel beam may be returned directly by reflection off a plane surface or reflected an odd number of times by further focusing reflectors before being returned through the region. The latter embodiment permits the location of a plane of complete overlap centrally within the region. The returned radiation is focused by the first focusing mirror to a point or line at a location just off the edge of the original mirror. This beam continues beyond this focus point to a yet further focusing mirror which reflects it back through another point or line of focus near but distinct from the preceding one. Then, after yet a third reflection from the first mirror the beam is returned into the region. The process may be repeated as desired until a point of focus is reached where an exit mirror redirects the radiation out of the pattern.

The points (or lines) at which the beam comes to a focus outside the region lie in a line (or plane). On successive traversals, the focal point will shift about a central point, first approaching it and then diverging away from it. After a predetermined number of traversals the focal point may be intercepted by the further reflecting surface so that the beam is retrieved from the system for subsequent use or discarding.

Because a very high degree of overlap may be achieved for the traversals of the radiation through the region and because the number of passes may be readily controlled by the positioning of the entry and recovery mirrors, it is possible to apply a plurality of beams of radiation to the same region in substantial overlap and with different numbers of traversals. In this manner, in the application to laser enrichment and isotope separation, that radiation having the highest probability of absorption may be applied for the minimum number of traversals whereas the radiation having the lowest probability of absorption may be applied for a greater number of traversals thereby adjusting the relative intensities of the multiple beams of radiation with respect to system absorption parameters.

BRIEF DESCRIPTION OF THE DRAWING

These and other features of the present invention are more fully described below in the accompanying detailed description, presented for purposes of illustration and not by way of limitation, and in the accompanying drawing of which.

DETAILED DESCRIPTION OF THE INVENTION

Figure 1:
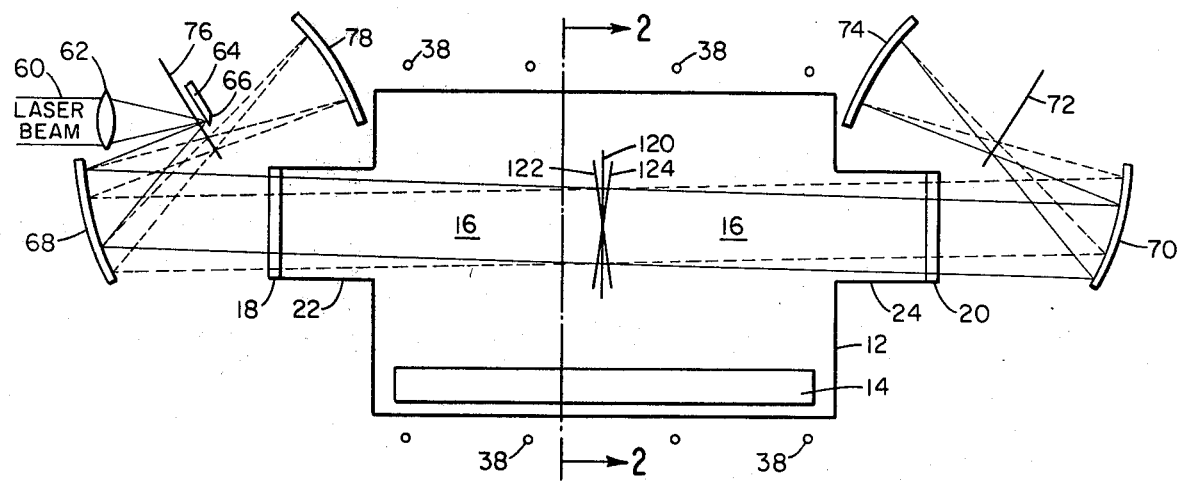
FIG. 1 is a schematic diagram of the first embodiment of the present invention as applied to isotope separation.

The present invention contemplates a method and apparatus whereby a beam of radiation is made to traverse a three-dimensional region a multiplicity of times, each traversal substantially overlapping the others such that the intensity of the radiation within the region is augmented in accordance with the number of traversals of the beam through it.

The structure and operation of the invention for accomplishing this purpose may best be illustrated by reference to the complete schematic diagram of the first embodiment of the invention presented in FIG. 1. As shown there, a chamber 12 is provided in which a vapor source 14 generates a linear, radially expanding vapor flow upward into a region 16 defining an ion extractor and which is illuminated with photoexciting and photoionizing radiation to generate ions with isotopic selectivity as is more completely treated in the above-referenced and incorporated patents and application. The radiation is applied to the region 16 through windows 18 and 20 set into the ends of pipes 22 and 24 positioned to remove the windows from the vapor region to reduce the rate of contamination of the windows with vapor particles.

The structure utilized for separating isotopes within the region 16 is more fully illustrated by reference to FIG. 2, a cross-sectional presentation of the chamber 12. As shown in FIG. 2, the chamber 12 includes a vapor source 14 which is typically a crucible 30 filled with a supply of uranium metal 32 to be evaporated by the energy in an impacting electron beam 34 which is applied along a line on the surface of the uranium metal 32 by the focusing action of a magnetic field 36 generated by coils 38 (FIG. 1) surrounding the chamber 12.

The region 16 typically includes a separation structure 40 that is shown by way of example only to comprise a set of collection plates 42 defining chambers 44 within which a central electrode 46 is placed to act as an anode for the application of a pulsed electric field to the plasma with equipotential surfaces surrounding the electrode 46 and acting to accelerate ions produced within the chambers 44 onto collection surfaces 42.

The ions are produced within the chambers 44 by the application of photoexcitation and photoionization radiation in the region 16 directly surround the anode 46. The region 16 may be illuminated by applying distinct beams of radiation to regions on either side of each electrode 46 as shown by cross-sectional regions 48 and 50, illustrated for the central electrode only.

Figure 2:
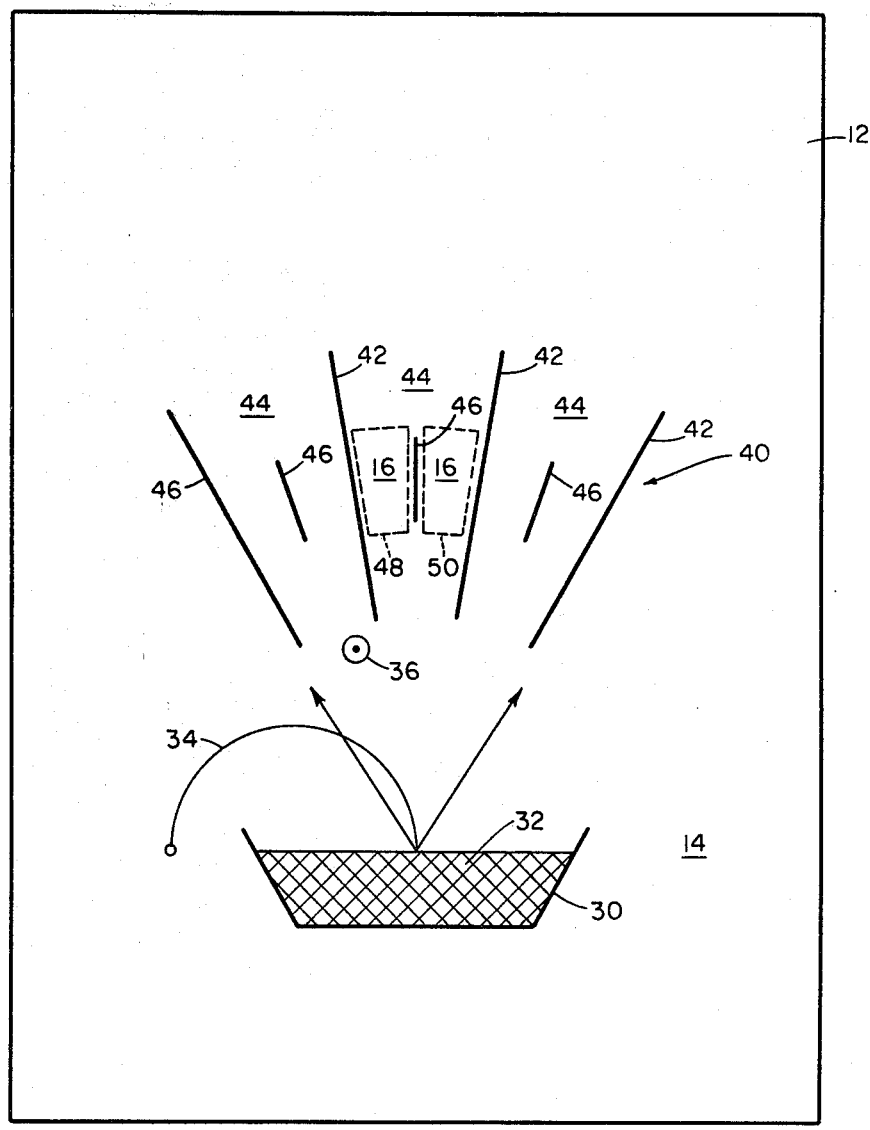
FIG. 2 is a sectional, schematic diagram of a portion of the FIG. 1 drawing.

By reference now back to FIG. 1, an optical system for illuminating one of the regions such as region 48 or 50 is illustrated. Similar systems may be employed for others of these regions. As shown there, a laser beam 60 is focused by a lens 62 to a point or line focus on the plane reflecting surface of a mirror 64, typically near its tip 66. Beam 60 may be a single beam of laser radiation tuned to produce isotopically selective photoexcitation to excited states or photoionization from an upper excited state, or which may be a composite beam of several frequencies tuned to produce isotopically selective photoexcitation and photoionization. In the case where focus is to a point, the lens 62 is of spherical characteristic whereas for focus to a line it would be of cylindrical characteristic.

The mirror 64 reflects the radiation toward a concave reflecting surface of a mirror 68 which in turn directs the radiation through the left-hand window 18 as a parallel beam of radiation dimensioned substantially to coincide with the cross-sectional area of the region 16 as represented by the region 48 or 50. This radiation will traverse the chamber 12 and exit through the window 20 to impinge upon a concave reflecting surface or mirror 70 which reflects and redirects the radiation to a point or line focus at a focal plane 72. The radiation continues beyond to a further reflecting surface or mirror 74 which reconverges the radiation to a separate point or line focus, in the focal plane 72, and back to the mirror 70 from which the radiation is reflected as a parallel beam back through the region 16 of the chamber 12. The beam exiting from the chamber 12 after two traversals which, in accordance with conditions specified below, can be made to substantially overlap each other and generally fill each region 16, strikes the first concave mirror 68 where it is reflected to a point or line focus within an image plane 76.

The point of focus is displaced substantially from the point of focus of the originally impinging beam 60 on the mirror 64, as will be more fully described below. This beam of radiation is then diverged toward a further reflecting surface or mirror 78 which in turn reconverges the radiation to a separate distinct point or line focus within the image plane 76 and beyond for reflection by the mirror 68 for passage through the chamber 12 in region 16 again. This process will continue for a predetermined number of traversals as the point or line focus in the image planes 72 and 76 converge toward the axes of mirrors 74 and 78 and then slowly diverge until at some point the beam strikes an obstruction such as the mirror 64.

Figure 3:
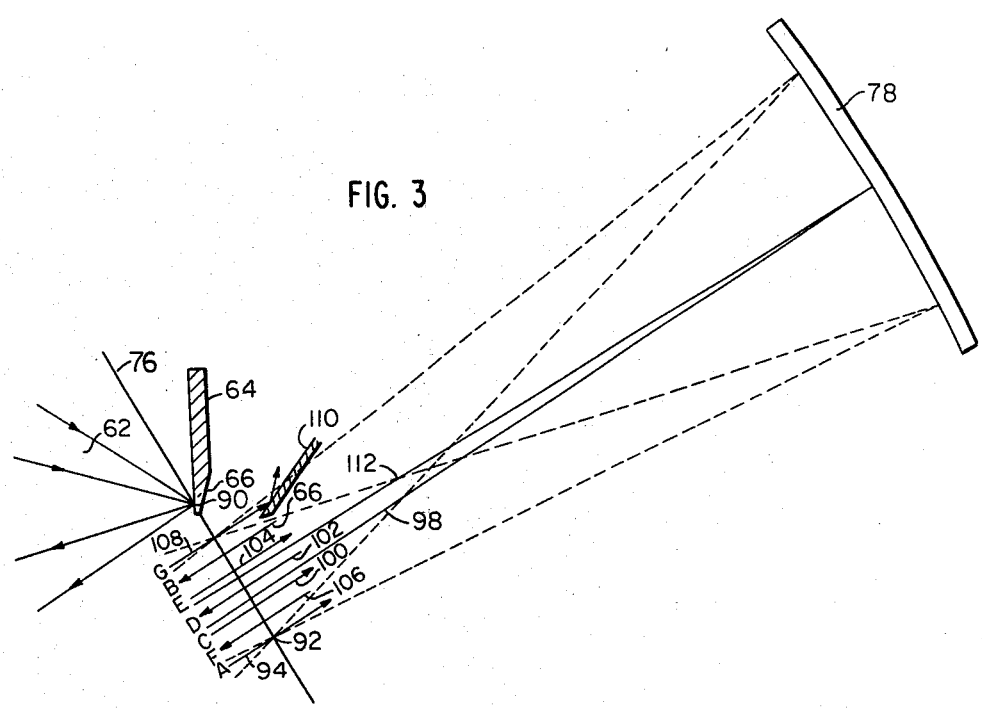
FIG. 3 is an expanded view of a portion of the FIG. 1 diagram illustrating the positional variation of the beam at the focal plane outside of the region for each of a plurality of traversals of the beam through the region.

With respect to FIG. 3, there is shown an expanded view of the region around the mirror 64 to illustrate the details of operation and of construction of the present invention. As illustrated there, the incoming beam 60 is focused to a point or line 90 on the tip 66 of the mirror 64 from whence it is reflected toward the mirror 68. After an outbound and an inbound pass through the chamber 12, the radiation will be converged to a point or line 92 on a path 94 remote from the mirror 64. That radiation reflected by the mirror 78 will be returned on a path 96 to the other side of an axis 98 which is the optical axis of the mirror 78. That radiation returning after two traversals will pass through the plane 76 on a path 100 closer to the axis 98. It will be reflected along a path 102 on the other side of the central axis 98. This radiation is returned upon a further path 104 to the same side of the axis 98 and farther from it. That radiation reflected from the mirror 78 will pass on a path 106 to the other side of the normal line 98 and it, after two traversals will be finally returned on a path 108 close to the mirror 64. At this point, or at any other traversal, it may be desired to provide an exit mirror 110 to direct the radiation on the path 108 away from the mirror 78 where it may be utilized for further purposes or discarded.

In order to provide this variation in focus, particularly where the points approach and then recede from a central axis, the mirrors must be aligned properly. In particular the image of the optical axis of the mirror 74 shown as an axis 112 must make an angle to the axis 98. In this manner the beams will walk in and out again because each reflection by the mirror 78 will be symmetrical about the normal 98 whereas the reflection by the mirror 74 will be symmetrical about the axis 112. The number of passes may be adjusted by the position of the mirror 64 and the angle between the axes 98 and 112. It is clear, of course, that if the angle between the axes 98 and 112 were the opposite, the system would continue to diverge from entrance of the beam and never converge.

In the preferred embodiment illustrated in FIG. 1, the beams meet at the center of the chamber 12 at a plane 120 where there is complete overlap. This is insured by imaging the mirrors 74 and 78 onto image planes 122 and 124 respectively, that is the mirrors 70 and 68 respectively image points on the surface of the mirrors 74 and 78 to points in the planes 122 and 124 respectively. These planes 122 and 124 intercept the plane 120 for this purpose.

If the image planes 122 and 124 did not cross at the central plane 120 but instead were moved respectively outwards toward the mirrors 74 and 78 a degree of spatial walk in addition to angular walk could be achieved for the system.

Figure 4:
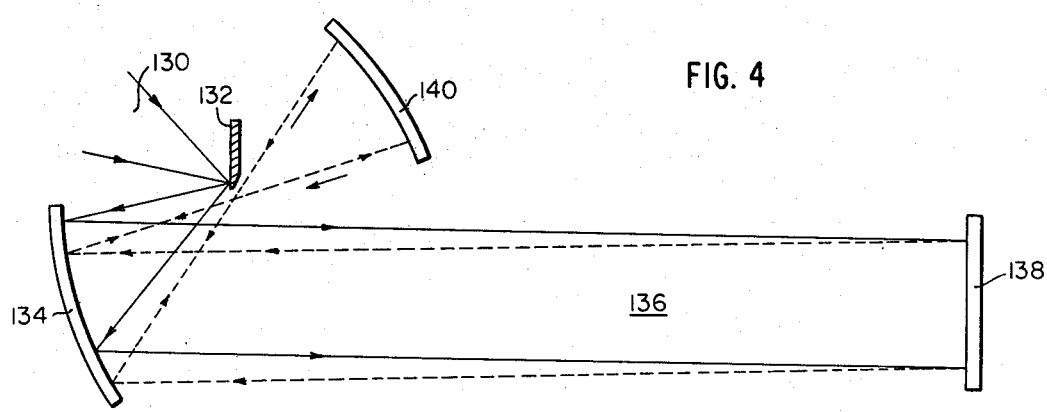
FIG. 4 is a simplified schematic diagram of a further embodiment to the invention alternative to that illustrated in FIG. 1.

A simplification of the system providing a second embodiment for the present invention is illustrated in FIG. 4 and is in effect one-half of the system of FIG. 1 using a plane or flat reflector at one end of the chamber to avoid the need for a second set of curved reflectors. As shown there, an input beam 130 is reflected by a mirror 132 onto a first concave mirror 134 which passes it through a region 136 typically of isotope separation for reflection by a plane mirror 138 and return to the mirror 130 whence it is reflected toward a further concave mirror 140. Similar considerations indicated above with respect to FIGS. 1 and 3 apply to FIG. 4, that is the optical axis or the normal to the mirror 138 imaged at the mirror 140 must make an angle to the normal of the mirror 140 in order to achieve the angular walk that permits focusing of the beam to different points along image planes by the mirrors 134 and 140.

The invention may be provided in differing forms according to the desires of the user and in particular, the lens 62 and mirrors 68, 70, 74 and 78 may be spherical in which case complete refocusing of the beam is achieved on each pass to offset the effects of beam divergence, as well as to some extent the inhomogeneities in refraction within the vapor environment. The lenses and mirrors may also be cylindrical and achieve a similar angular walk effect of multipass, partially overlapping radiation paths. In the case of cylindrical mirrors, it is preferable that they be cylindrical in different planes at each end of the chamber, that is mirrors 68 and 78 be flat in the direction normal to the page while the mirrors 70 and 74 be flat in a direction within the plane of the page. In this manner, refocusing is also achieved on each round trip of the beam to overcome the divergence effects.

Additionally, the mirror 64 need not be placed at precisely the point of focus of the beam 60 provided by the lens 62 but may be at a point having a finite spot size so long as there is sufficient distance between the mirror edge and the trajectories of the beam on all passes desired through the system. By thus broadening the beam, the power density at the reflecting surface can be distributed. A similar effect may be employed by reflecting the beam from the mirror 64 at a grazing incidence as opposed to the acute angle illustrated in FIG. 1. The lens 62 may be replaced by a reflective element as is desired.

Additionally, while it is illustrated in FIG. 3 that the entrance and exit mirrors 64 and 110 may be placed to the same side of the chambers, it is clear that the mirrors may be separated at opposite ends of the chambers to provide flexibility in the location of support apparatus.

In producing the initial alignment of the system illustrated in FIG. 1, it might be found convenient to place image screens at the location of the planes 72 and 76 in order to place, for example the first pass 92 at a precisely predetermined point and to then remove the screen partially so as to locate the return reflection 96, again at the precisely determined point. A similar step may be applied at the location of image plane 72 for aligning the various mirrors using known alignment controls.

Figure 5:
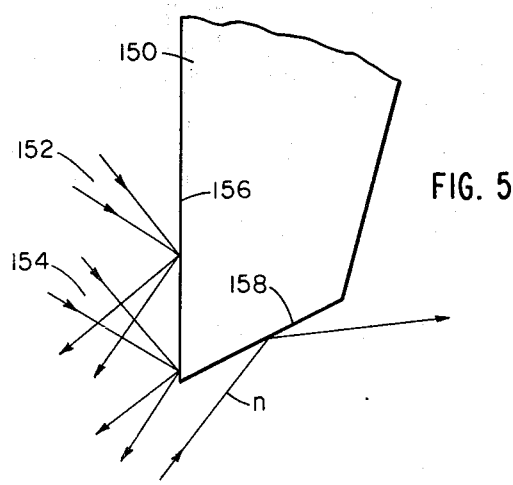
FIG. 5 is an expanded diagram of a portion of the embodiment of FIGS. 1 or 4 illustrating a system by which several distinct beams of laser radiation may be applied in substantial overlap to the same three-dimensional region.

It may additionally be desired to adapt the system of the present invention to apply spatially distinct beams of radiation to the chamber 12 for purposes of producing a different number of reflection passes through the vapor environment, particularly in the case where the absorption rate or probability of absorption for the two radiations is vastly distinct. Such a system is illustrated in FIG. 5 in which a mirror 150 is greatly expanded in view as a representation of the mirror 64. As shown there, the mirror 150 receives first and second beams 152 and 154 at different points upon its reflecting surface 156. The radiation in the beam 154, applied closest to the tip of the mirror 150 is intended to miss the mirror on the succeeding traversals while walking in and out again. It would experience the most number of traversals before exiting. The beam 152, placed farthest from the tip, would re-encounter the mirror 150 after a fewer number of reflections. As illustrated in FIG. 5, it may be convenient to use a bottom surface 158 of the mirror 150 to act as an exit mirror. In this manner it is possible to apply to the chamber two spatially separate radiations resulting in substantially complete mixing of the two beams within the region of interest for isotopically selective photoexcitation and ionization.

Figure 6:
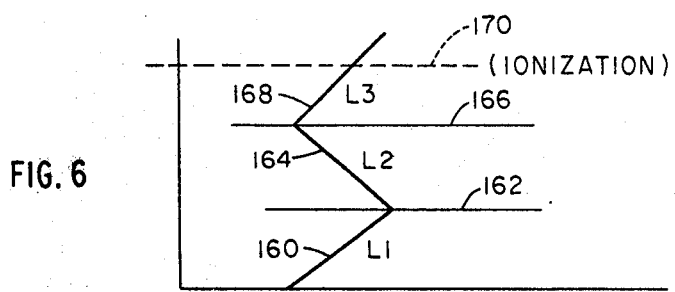
FIG. 6 is an energy level and transition diagram useful in explaining the present invention.

This is of particular significance in uranium enrichment where the process employs typically three steps of energy excitation such as illustrated in FIG. 6. As shown there, the first step 160 produces excitation to a first excited level 162 from which a further energy step 164 is produced by additional laser radiation to a second excited state 166. From the exited state 166, ionization may typically be achieved in a final energy step 168 to a point above the ionization level 170. In the typical case, the absorption cross-section or absorption rate for energy in the radiation provided for the final step 168 is vastly lower than that for the steps 160 and 164. As a result, it is possible to inject the radiation for the step 168 as the beam 154 (FIG. 5), for producing a greater multiplicity of traversals of the radiation, effectively increasing its intensity within the region of interest.

Figure 7:
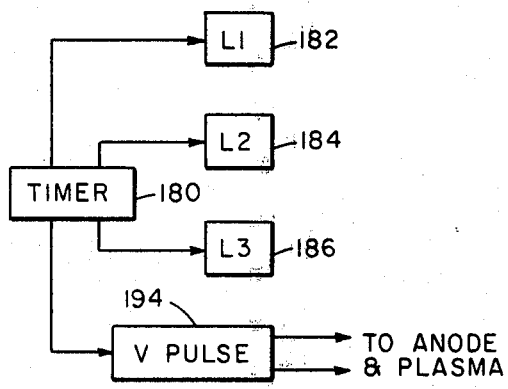
FIGS. 7-8 are a laser synchronizing apparatus and a timing diagram respectively.
Figure 8:
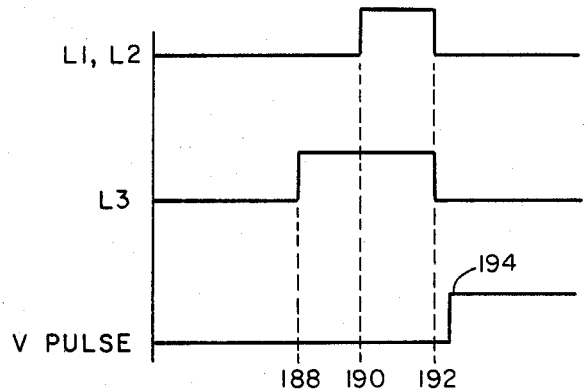

It may additionally be desired to let the intensity for this beam build up to full intensity before the application of the radiation for the steps 160 and 164 using a sequence illustrated in FIGS. 7 and 8. As shown there, a timer 180 may be employed to activate laser systems 182 and 184 typically simultaneously, to generate radiation for the steps 160 and 164 slightly delayed from activation of the system 186 for providing the radiation for the step 168. Each of the systems 182, 184 and 186 may include one or more appropriately tuned lasers, with or without pulse interleaving and amplification systems as is desired.

The timing can be as illustrated in FIG. 8 in which the beam of radiation from the system 186 is commenced in each of repeating time sequences at a time 188, in advance of a time 190 at which the systems 182 and 184 are excited. The difference in time between the time points 188 and 190 may be such as to permit the complete build-up of the intensity of the radiation from system 186 within the chamber. In such case, none of the radiation originally applied in the beam from the system 186 is lost because it is captured within the chamber on the multiple traversals. Subsequent thereto the systems 182 and 184 may be activated, while radiation from the system 186 is maintained, all beams of radiation existing typically until a turn-off time 192 up to a significant fraction of a microsecond later. Directly after the termination of radiation from all systems 182, 184 and 186, the timer 180 may activate a voltage pulse source 194 at a directly subsequent time 196 to apply an accelerating potential between the anodes 46 and the plasma in the chambers 44.

Figure 9:
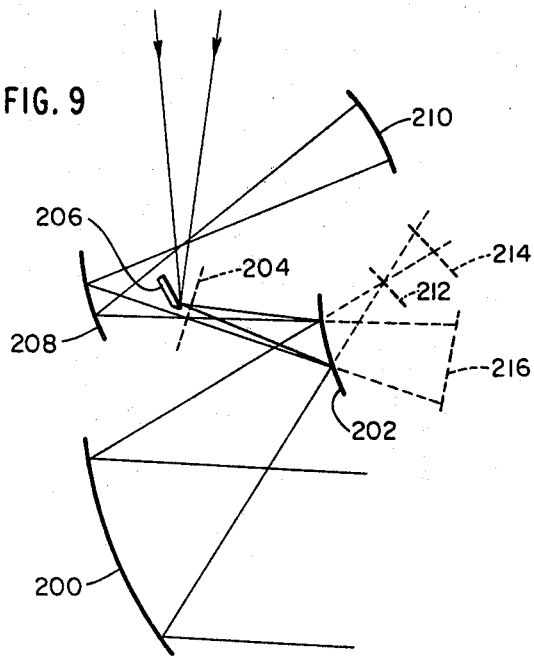
FIG. 9 is a schematic diagram of a modified embodiment of the invention.

With respect now to FIG. 9, there is shown an optional system for magnifying the plane of the focal points at which the radiation passes on distinct paths. As shown there, a mirror 200 is provided, corresponding substantially to the mirror 68 in FIG. 1. Radiation from the chamber 12 and mirror 200 is reflected by a convex mirror 202 to slow the reconvergence to a focal plane 204, effectively the focal point of the mirror 200 at which an entrance mirror 206 is provided. For radiation to be re-reflected through the chamber 12, a further concave mirror 208 is provided beyond the plane 204 which operates with a further concave mirror 210 to return radiation to the chamber 12. In this manner the original focal plane 212 for the mirror 200 is extended significantly beyond to the new plane 204, thereby increasing spot size. Further image planes 214 and 216 are shown representing the focal plane of the mirror 202 and the image plane for the mirror 210, as they would be provided.

In accordance with the invention described above, a system is shown for applying radiation to a three-dimensional region. This region is typically a cavity or chamber used for isotope separation. In this case the invention provides the advantage of more efficient utilization of the generated laser energy. In addition, beam divergence problems are more easily dealt with by the repeated refocusing of the beam. In addition, because of the statistical averaging effect of the multiple passes, uniformity of radiation is greatly improved. If laser energy tends to shift in frequency due to mode shifting or chirping effects, the multipass concept and substantial overlap provided thereby tends to make all frequencies or modes simultaneously available throughout the entire region illuminated. It is possible to combine beams in the region of interaction while maintaining their substantially distinct and separate character. In addition, timing requirements on beam sequencing or synchronization are relaxed in view of the longer availability of the beam to the cavity from its multiple reflection. And finally, among the other advantages, the system permits the tailoring of radiation intensity for the various energy steps of an isotope separation system in accordance with the absorption cross-sections for the radiation of each step.

The above-described embodiments are intended as exemplary only, modifications and alterations being intended within the spirit of the invention as defined in the following claims.

What is claimed is:

1. A system for providing multipass illumination of a three-dimensional zone extending in an axial direction comprising:
   a source of radiation;
   means for directing radiation from said source axially into said zone;
   means for reflecting said radiation on a plurality of traversals through said zone each succeeding traversal substantially but not completely overlapping the portion of said zone illuminated by the preceding traversal; and
   means responsive to radiation passing through said zone after a predetermined number of traversals for inhibiting further passage of said radiation through said zone.

2. The system of claim 1 wherein said reflecting means includes a reflector.

3. The system of claim 2 wherein said reflector includes a plain mirror.

4. The system of claim 1 wherein said reflecting means includes focusing means.

5. The system of claim 4 wherein said focusing means provides a image outside of said zone of a substantially central plane within said zone orthogonal to said axis.

6. The system of claim 1 wherein said reflecting means includes:
   a first concave mirror responsive to radiation from said zone for direction thereof away from said zone;
   a second concave reflector responsive to radiation directed away from said zone by said first concave reflector for reflecting radiation back toward said first concave reflector and ultimately back toward said zone.

7. The system of claim 6 wherein said first concave reflector provides an image of the surface of said second concave reflector within said zone.

8. The system of claim 6 wherein said first and second concave reflectors are cylindrical reflectors.

9. The system of claim 8 wherein said first and second concave reflectors have the axes of the imaging cylinders of which they are a part orthogonal to each other.

10. The system of claim 6 wherein said first and second concave reflectors are spherical reflectors.

11. The system of claim 1 wherein:
   said reflecting means includes first and second concave reflectors; and
   said directing means includes a further reflector responsive to radiation from said source for directing said radiation towards said first concave reflector for direction axially through said zone;
   said first concave reflector positioned to receive radiation from said zone for direction toward said second concave reflector with said second concave reflector positioned to reflect the radiation incident thereon back toward said first concave reflector for direction through said zone;
   said first and second concave reflectors having a focal plane for radiation in said zone between said first and second concave reflectors;
   the radiation having a minimum waist dimension at said focal plane with the position of said minimum waist upon said focal plane varying from one traversal to another traversal of said zone by said radiation.

12. The system of claim 11 further including:
   means for expanding the dimensions of said focal plane.

13. The system of claim 12 wherein said expanding means includes a convex and concave reflector between said first and second concave reflectors.

14. The system of claim 11 further including means for intercepting the radiation substantially at said focal plane after a predetermined number of traversals thereby to inhibit further traversals of said zone by said radiation.

15. The system of claim 14 wherein said inhibiting means includes means for reflecting said radiation away from said zone.

16. The system of claim 13 wherein said further reflector has its reflecting surface located substantially at said focal plane.

17. The system of claim 1 further including means for separating isotopes with said zone being defined as an interior region of said means for separating isotopes.

18. The system of claim 17 further including means for directing a flowing vapor of a plurality of isotopes, one of which is to be separated therefrom, through said zone.

19. The system of claim 17 wherein said radiation source includes means for providing plural radiation frequencies adapted for producing isotopically selective photoexcitation.

20. The system of claim 1 wherein:
said radiation source provides radiation of plural different frequencies;
said directing means includes means for inhibiting further traversals of said zone at different predetermined numbers of traversals for the radiation of different frequencies.

21. The system of claim 1 wherein:
said reflecting means has at least one focal plane which is reimaged parallel and at least proximate to itself by said reflecting means.

22. The system of claim 1 wherein:
said reflecting means includes plural reflectors with the surface of at least one reflector imaged to a plane within said zone.

23. The system of claim 1 wherein the image plane is central within said zone and correspondes to the location of the plane at which the surface of another of said plural reflectors is imaged.

24. The system of claim 1 wherein said reflecting means includes plural reflectors with the surface of one imaged to a plane on an opposite side of said zone.

25. The system of claim 1 wherein the image plane is proximate of another of said plural reflectors, said other of said plural reflectors being a plane reflector.

26. A reflective system for providing substantially overlapping multiple traversals of a region to be illuminated by radiation wherein each suceeding traversal of radiation substantially but not completely overlaps the portion of the region illuminated by the preceeding traversal comprising:
first and second reflective systems positioned at opposite ends of said region to be illuminated;
said first and second reflective systems each having respective optical axes associated therewith, the optical axis of one of said reflective systems projected to the other reflecting system forming an angle to the optical axis of said other reflecting system.

27. The system of claim 26 wherein:
at least one of said first and second reflective systems having associated therewith a focal plane to which parallel radiation in said region is focused.

28. The system of claim 26 wherein at least one of said first and second reflective systems includes at least first and second curved reflectors with the first curved reflector optically closer to said region than the second curved reflector and providing an image of said second curved reflector in a region between said first and second reflective systems.

29. The system of claim 28 wherein said first and second reflector systems are substantially the same.

30. The system of claim 28 wherein the other of said first and second reflective systems is a plane reflector.

31. The system of claim 28 further including:
reflector means adjacent at least one of said focal planes adapted for diverting radiation from reflection through said region; and
means proximate to at least one of said focal planes for diverting radiation into said region.

32. The system of claim 28 further including:
means for expanding the dimensions of said focal plane.

33. The system of claim 32 wherein said means for expanding the dimensions of said focal plane includes a convex mirror.

* * * * *